(12) United States Patent
Maichel

(10) Patent No.: US 9,004,095 B2
(45) Date of Patent: Apr. 14, 2015

(54) SUPPORT STRUCTURE FOR REPAIR OF PIPELINE CONTROLS

(76) Inventor: Jeffrey L. Maichel, Murrieta, CA (US)

( * ) Notice: Subject to any disclaimer, the term of this patent is extended or adjusted under 35 U.S.C. 154(b) by 107 days.

(21) Appl. No.: 13/702,292

(22) PCT Filed: Jun. 9, 2011

(86) PCT No.: PCT/US2011/039880
§ 371 (c)(1),
(2), (4) Date: Dec. 5, 2012

(87) PCT Pub. No.: WO2011/156660
PCT Pub. Date: Dec. 15, 2011

(65) Prior Publication Data
US 2013/0068985 A1    Mar. 21, 2013

Related U.S. Application Data

(60) Provisional application No. 61/353,188, filed on Jun. 9, 2010.

(51) Int. Cl.
*F16L 41/06*    (2006.01)
*F16K 27/00*    (2006.01)
*F16K 3/02*    (2006.01)
*F16K 43/00*    (2006.01)

(52) U.S. Cl.
CPC .............. *F16K 27/00* (2013.01); *F16K 3/0272* (2013.01); *F16K 43/001* (2013.01)

(58) Field of Classification Search
CPC ...... F16K 3/0272; F16K 27/00; F16K 43/001
USPC ......... 137/15.12, 15.13, 15.14, 317, 318, 319
See application file for complete search history.

(56) References Cited

U.S. PATENT DOCUMENTS

| | | | |
|---|---|---|---|
| 3,908,691 A | | 9/1975 | Coughlin |
| 3,948,282 A | | 4/1976 | Yano |
| 4,332,272 A | | 6/1982 | Wendell |
| 4,527,586 A | * | 7/1985 | Yano et al. ..................... 137/318 |
| 5,483,990 A | * | 1/1996 | Martin .......................... 137/318 |
| 5,660,199 A | * | 8/1997 | Maichel ..................... 137/15.14 |
| 6,530,389 B2 | * | 3/2003 | Sato et al. .................. 137/15.14 |
| 6,776,184 B1 | * | 8/2004 | Maichel et al. ............... 137/318 |
| 6,983,759 B2 | | 1/2006 | Maichel |
| 7,225,827 B2 | * | 6/2007 | Maichel et al. ............... 137/318 |
| 2009/0140195 A1 | * | 6/2009 | Shibata et al. ................ 251/327 |
| 2009/0260695 A1 | * | 10/2009 | France et al. ................. 137/318 |

FOREIGN PATENT DOCUMENTS

JP    2007-177945    7/2007

OTHER PUBLICATIONS

International Search Report and Written Opinion, International Patent Application No. PCT/US2011/039880, Feb. 17, 2012.
International Preliminary Report on Patentability, International Patent Application No. PCT/US2011/039880, Dec. 10, 2012.

* cited by examiner

*Primary Examiner* — John K Fristoe, Jr.
*Assistant Examiner* — Kevin Barss
(74) *Attorney, Agent, or Firm* — Michael Fedrick; Loza & Loza, LLP

(57) ABSTRACT

A pipeline control unit that connects two conduits attached to opposing sides of a housing with an attachable pressure cover plate and a valve servicing assembly that can be installed onto the housing to form a fluid-tight structure. A pipeline control mechanism can be mounted in an access opening of the pipeline control unit to enable a user to selectively control fluid flow through the housing. The pipeline control unit allows the removal and replacement of the pipeline control mechanism without depressurizing a pipeline system.

22 Claims, 16 Drawing Sheets

SUPPORT STRUCTURE FOR REPAIR OF PIPELINE CONTROLS

CROSS-REFERENCE TO RELATED APPLICATIONS

The present application is the U.S. national stage of International Patent Application No. PCT/US2011/039880, filed on Jun. 9, 2011 and entitled "SUPPORT STRUCTURE FOR REPAIR OF PIPELINE CONTROLS," which claims the benefit of priority under 35 U.S.C. §120 to U.S. Patent Application No. 61/353,188, filed Jun. 9, 2010 and entitled "Flange Support Structure for Pipeline Controls that Allows Repair." The disclosures of the foregoing applications are incorporated herein by reference in their entirety.

BACKGROUND

1. Technical Field

The present invention relates generally to a flanged support structure that retains various pipeline control mechanisms without housing them in a pressurized "mother-valve" or fluid-retaining container during their useful life. This structure can support a pipeline control mechanism such as a directional-flow mechanism, an orifice plate/conduit-spacer and/or a protection-screen in fluid-tight arrangement in lines carrying water, sewer, natural gas, or other fluids. The present flange structure can allow such pipeline control mechanisms to be replaced under pressure without first shutting down the line. If a line can be easily depressurized or shut down, this assembly can also aid in quick removal and installation of a pipeline control mechanism by hand.

2. Description of Related Art

A typical repair valve is not a flanged structure that can allow depressurization of the structure surrounding an internal valve. Existing U.S. Pat. Nos. 3,908,691 and 6,983,759 for example provide a "mother-valve" completely encompassing and containing a repairable or removable valve which is submerged in the pipeline fluid during its entire useful life. The valve can include a one-piece manufactured structure to provide a hollow through-passage or hollow interior that extends between first and second ends of the housing of the valve. The first and second ends are threaded, flanged, grooved, weld-ended or otherwise configured so that a user can readily connect each end to a respective one of separate first and second pipeline sections, either directly or via intermediate fittings.

The container that houses the replaceable valve cartridge is built in a way similar to a typical valve, but being a "mother-valve" it encompasses in its pocket a removable internal valve and incorporates features that allow an adaptable isolation gate to perform removal of the pipeline control mechanisms without disruption of system or the pressure from within the pressurized container. More specifically, part of the structure defines an opening that provides access to the pressurized cavity of the "mother-valve" interior. A pipeline control mechanism is removably mounted within that opening in fluid-tight engagement with the "mother-valve" structure. There it functions as means for enabling the user to selectively stop and unstop fluid communications between the first and second pipeline sections.

Known repairable valves cannot easily use off-the-shelf pipeline control mechanisms, actuators and levers without providing complicated fluid-tight seals between the "mother-valve" and the pipeline control mechanism because they are pressurized together. The pipeline control mechanism will either require a custom built bonneted product produced to fit the "mother-valve" or a pressure cover plate that requires a stem packing so a custom extension can be used to operate the pipeline control mechanism within the "mother-valve" and can be operated externally.

Regardless of the particular style of known repair valves, all past mechanisms use a completely pressurized container similar to a bowl in shape to hold the pipeline control mechanism where both are pressurized. This container or valve body remains flooded during its lifetime and cannot be completely depressurized to be cleaned out because the system is fully pressurized at all times.

Corrosion is caused by the existing "mother-valve" being filled with pipeline fluid during its useful life. This body holds particles as well, encouraging corrosion to eat away at the valve body fairly quickly. When a pipeline control mechanism is removed from a "mother-valve", debris falls into the cavity between the pipeline control mechanism and the "mother-valve," and upon reinstallation of the pipeline control mechanism the particles can impede proper sealing of the pipeline control mechanism to the "mother-valve".

Left over particles and corrosion can hinder proper seating of the pipeline control mechanism to the "mother-valve" and make it difficult to replace pipeline control mechanisms under pressure in a fluid-tight manner.

Some pipeline systems can be out of service for short periods of time but then need to be on line again without delay. In that event, when the system can be shut down easily for a few minutes to make repairs or change valves, quick change valves will often leave debris in the "mother-valve."

Another common problem with known repair valves relates to the procedure of hot tapping. This known operation leaves behind many cuttings or chips created by a hole-saw cutting its way through an existing pipeline and depositing many cuttings within the pressurized vessel. Shavings from the hot tapping operation remain within the pressurized interior of the repair valve cavity especially between the pipeline control mechanism and the "mother-valve". Debris left in the "mother-valve" can create unsuitable seating of the pipeline control mechanism once installed into position after the hot-tapping procedure is performed, allowing future corrosion from unprotected steel shavings mixed with fluids from the pipeline that are left to sit over time.

Shutting down a pipeline is becoming more difficult with each passing year. When industrial plants must stop production to replace a valve it is costly, and if hospitals and cities require a shut down to repair a valve, customer services are not available during such replacement period. Hospitals and large computer cooling systems are very difficult and costly to shut down due to the nonstop services they perform. Today, pipeline systems also have an inability to shut down caused by the aging of infrastructure and pipeline controls. It is also essential that some pipeline systems remain active, such as in laboratories and nuclear facilities. In addition, the difficulty in disposing of hazardous products used in many pipeline systems creates environmental issues, so shutting down and draining a system can be very difficult and expensive.

SUMMARY

The present invention relates to a pipeline control unit that includes a housing for connection to fluid conduits and a pipeline control mechanism, such as a valve or monitor. The valve, for example, can be a check valve, a flow-through cartridge, a butterfly valve, a plug, a ball valve, an orifice plate, a gate valve or a protection screen, and the monitor can be a temperature monitor or a flow monitor.

The housing of the present pipeline control unit includes a first side having a first opening for connection to a first fluid conduit and a second side having a second opening for connection to a second fluid conduit. In one embodiment, the first and second sides can be formed on a first plate and a second plate, where the first and second plates are joined by two side walls which extend between lateral sides of the first plate and the second plate. Between the first and second sides of the housing, and between such lateral walls, is an interior compartment that extends between the first and second openings. On opposite sides of the first and second sides and the lateral walls are two access openings, referred to for convenience as an upper access opening and a lower access opening, though orientations other than "upper" and "lower" are included within such terminology.

The pipeline control mechanism of the present pipeline control unit provides fluid communication between the first and second openings of the housing when it is removably installed within the housing. The pipeline control unit is generally installed through one of the openings, such as through the upper access opening, and is placed in fluid-tight engagement with the interior compartment of the housing.

The interior compartment of the housing comprises a first interior face in communication with the first opening and a second interior face in communication with the second opening, and the first interior face is preferably disposed at an acute angle with respect to the second interior face. In such embodiments, the pipeline control mechanism can comprise a first face for engaging the first interior face of the interior compartment in a fluid-tight manner and a second face for engaging the second interior face of the interior compartment in a fluid-tight manner, with the first and second faces of the pipeline control mechanism being disposed at an acute angle corresponding to the acute angle of the first and second interior faces of the interior compartment. In this way the pipeline control mechanism can be installed, such as by wedging the narrower side of the mechanism into the housing, so as to provide fluid-tight communication between the first and second openings of the housing.

In an alternative embodiment, a pipeline control mechanism can be attached to a wedge plate, the wedge plate comprising a first face for engaging the first interior face of the interior compartment in a fluid-tight manner and the pipeline control mechanism comprising a second face for engaging the second interior face of the interior compartment in a fluid-tight manner. In this embodiment the first face of the wedge plate and the second face of the pipeline control mechanism are disposed at an acute angle corresponding to the acute angle of the first and second interior faces of the interior compartment. In a further alternative embodiment, the pipeline control mechanism can be attached to a first wedge plate and a second wedge plate, the first wedge plate comprising a first face for engaging the first interior face of the interior compartment in a fluid-tight manner and the second wedge plate comprising a second face for engaging the second interior face of the interior compartment in a fluid-tight manner, with the first face of the first wedge plate and the second face of the second wedge plate being disposed at an acute angle corresponding to the acute angle of the first and second interior faces of the interior compartment.

In order to maintain pressure within the pipeline system within which the present pipeline control unit operates during the change or repair of the pipeline control mechanism, a cover plate (which may be formed from one or more constituent parts) is reversibly secured in a fluid-tight manner to the lower access opening. The upper access opening can be likewise reversibly secured in a fluid-tight manner with a cover assembly, and in some embodiments also with an isolation valve assembly. This allows the pipeline control mechanism to be installed or removed from the housing through such an isolation valve assembly when the cover plate and isolation valve assembly are connected to the housing, without interrupting a flow of fluid between the first and second openings. The cover plate, cover assembly, and/or isolation valve assembly can be reversibly secured to their respective component of the present pipeline control unit with one or more connectors, such as flanges and/or threaded screw connectors.

The isolation valve assembly fitted to the present pipeline control unit can, in one embodiment, comprise a slide gate comprising a moveable gate barrier and a receptacle for receiving the gate barrier which is secured on a lower side to the upper access opening. A cover assembly can then be secured to the upper side of the isolation valve assembly, with the cover assembly comprising a hollow interior for retaining the pipeline control mechanism and a mechanism, such as a gate-advancing mechanism, for attachment to the pipeline control mechanism. The gate-advancing mechanism is operable to conduct the pipeline control mechanism into the hollow interior of the cover assembly, when the pipeline control mechanism is in need of repair or replacement, for example.

A further aspect of the present invention is a method for removing a pipeline control mechanism as described above under pressure. In this method, a cover plate is attached in a fluid-tight manner to the lower access opening and an isolation valve assembly is likewise attached to the upper access opening in a fluid-tight manner. The isolation valve assembly includes a gate attached to the upper access opening, for creating a fluid tight seal, as well as a cover assembly attached to the gate. The cover assembly includes a hollow interior for retaining the pipeline control mechanism. Once these components have been attached to the housing, the pipeline control mechanism is withdrawn through the upper access opening and into the cover assembly. The gate of the isolation valve assembly can then be closed to create a fluid tight seal.

In this way, the pipeline of which the present pipeline control unit is a part can continue to operate under pressure, while the cover assembly can be depressurized and opened in order to remove the pipeline control mechanism for replacement or repair. After removing the pipeline control mechanism from the cover assembly, a new or repaired pipeline control mechanism can be placed in the cover assembly, which can then be closed and sealed. The gate of the isolation valve assembly can then be opened, and the new or repaired pipeline control mechanism can be conducted from the interior of the cover assembly, through the gate and the upper access opening, and into the housing while system is still pressurized. The pipeline control mechanism can then be installed in fluid-tight engagement with the interior compartment of the housing of the pipeline control unit. Once this is accomplished, the isolation valve assembly can either remain in place or can be removed from the upper access opening of the pipeline control unit. The cover plate can likewise be disconnected from the lower access opening of the pipeline control unit and removed, or can be left in place. Preferably, at least one restraining device, such as a threaded machine screw, can be installed to connect the pipeline control mechanism and/or any wedge plate attached thereto to the housing in order to more securely retain such components prior to removal of the valve servicing-assembly or thereafter.

In a further embodiment, interior of the housing of the pipeline control unit can be cleaned by attaching a scraping attachment to the pipeline control mechanism, preferably to a lower portion of the pipeline control mechanism. When the pipeline control mechanism is inserted into or removed from the housing, the scraping attachment contacts the interior faces of the housing and mechanically removes materials deposited or otherwise attached thereto.

DRAWINGS

Figure 4:
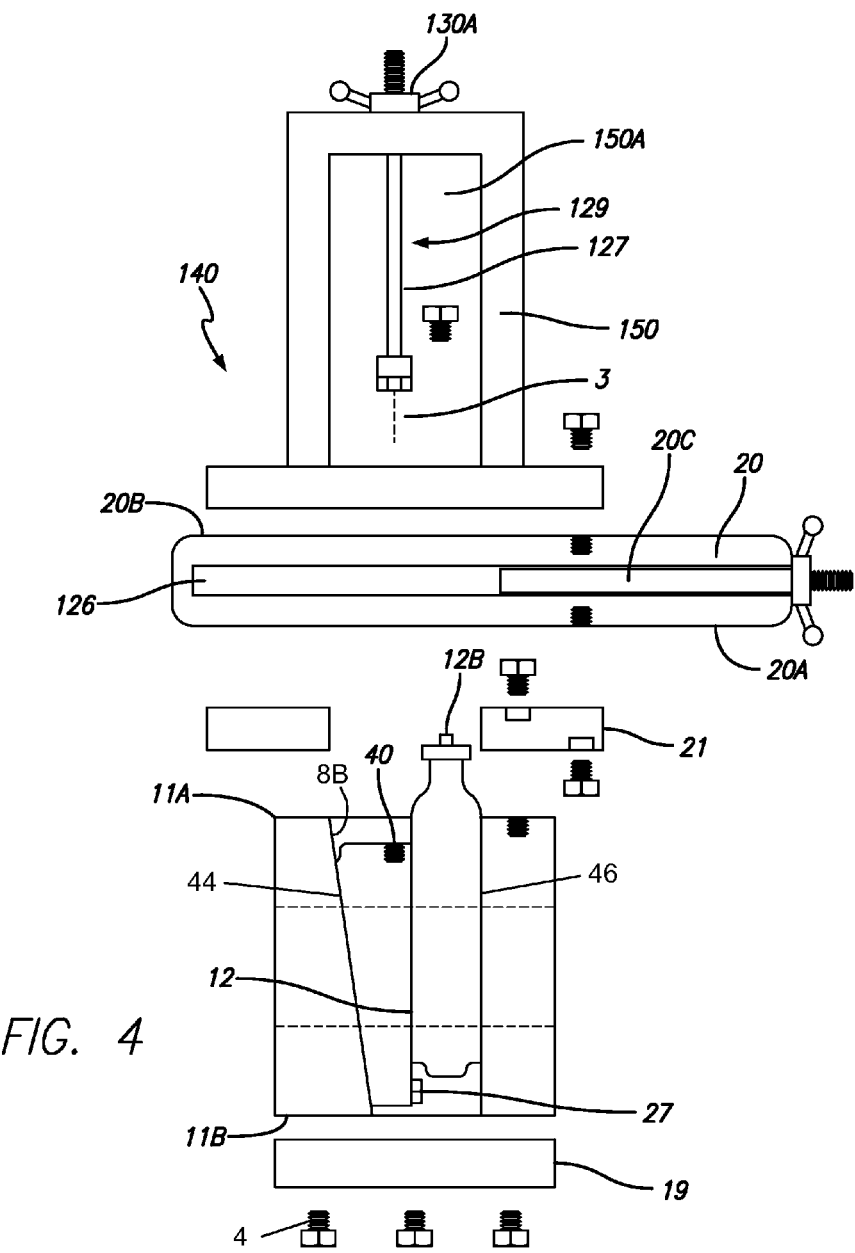
FIG. 4 is an exploded, side sectional view of the present pipeline control unit showing added components that can allow pressurization of the pipeline control unit to allow servicing operations.
Figure 5:
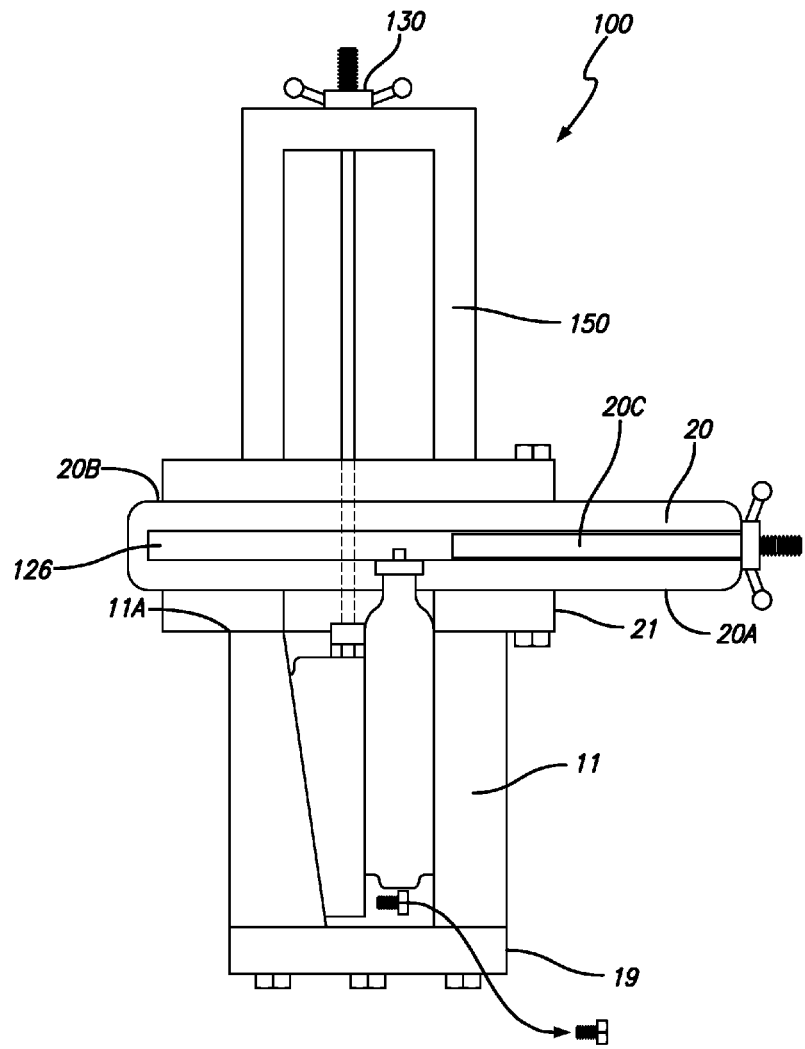

FIG. 5 is side sectional view of the pipeline control unit of FIG. 4 in an assembled configuration. An isolation valve assembly is selectively mounted over one access opening, with a chamber above and a service assembly retraction mechanism attached to the pipeline control mechanism, including an installation-retraction mechanism used to restrain the pipeline control mechanism in position. FIG. 5 also illustrates the removal of a restraining-device or bolt prior to installation of a pressure cover plate selectively installed over the opposite access opening in fluid-tight fashion.

Figure 6:
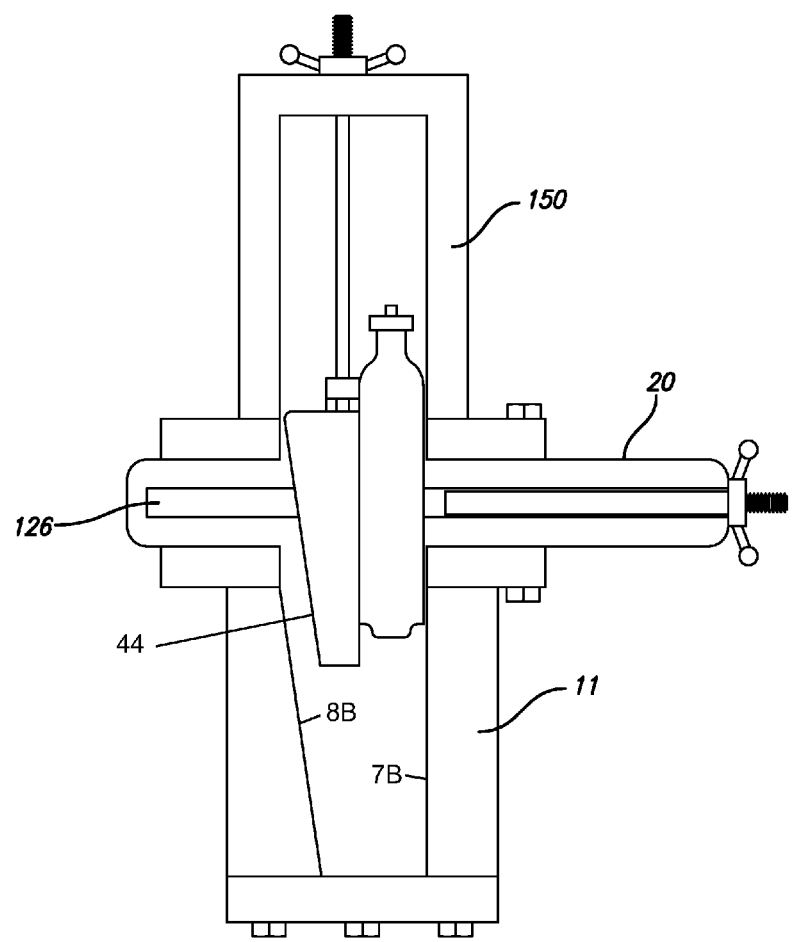

FIG. 6 is side sectional view of the pipeline control unit of FIG. 5, showing the pipeline control mechanism being retracted from the housing through the open isolation valve assembly and entering the attached chamber, while the housing, valve-servicing assembly and pipeline are fully pressurized.

Figure 7:
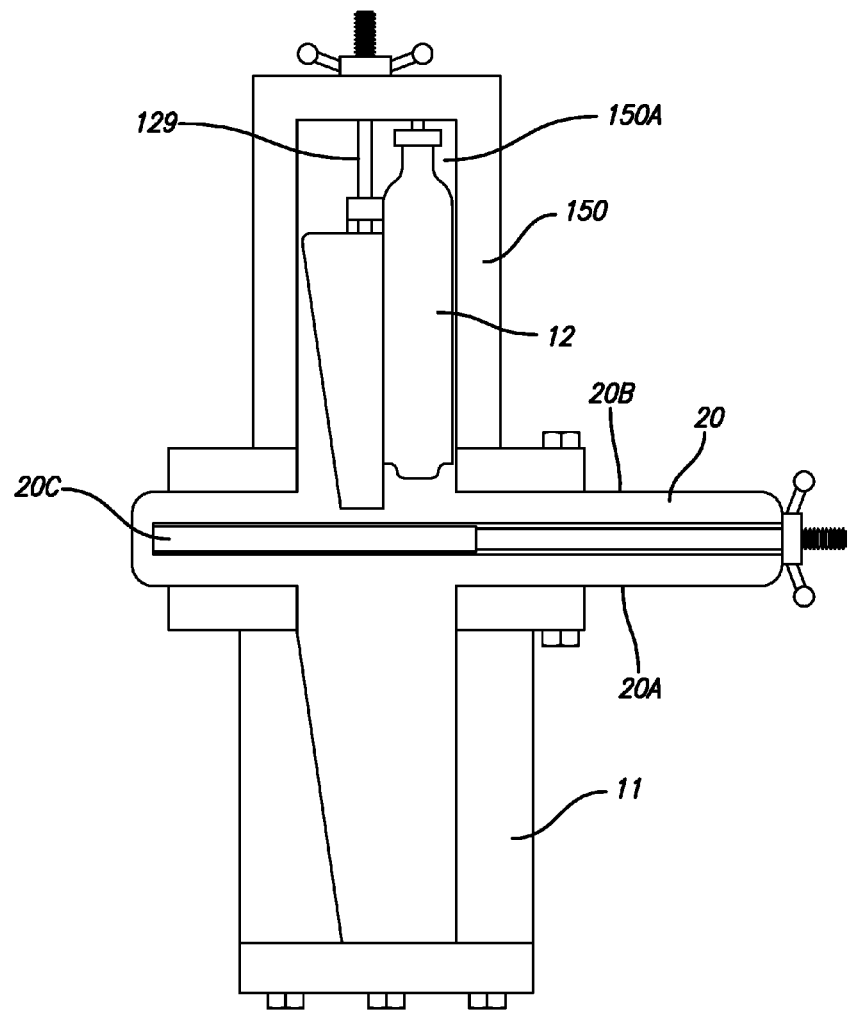

FIG. 7 is side sectional view of the pipeline control unit of FIG. 5 showing the pipeline control mechanism retracted completely into the attached chamber with the isolation valve now in the closed position to allow depressurization of the attached chamber so that the pipeline control mechanism can be removed along with the attached chamber.

Figures 8, 9:
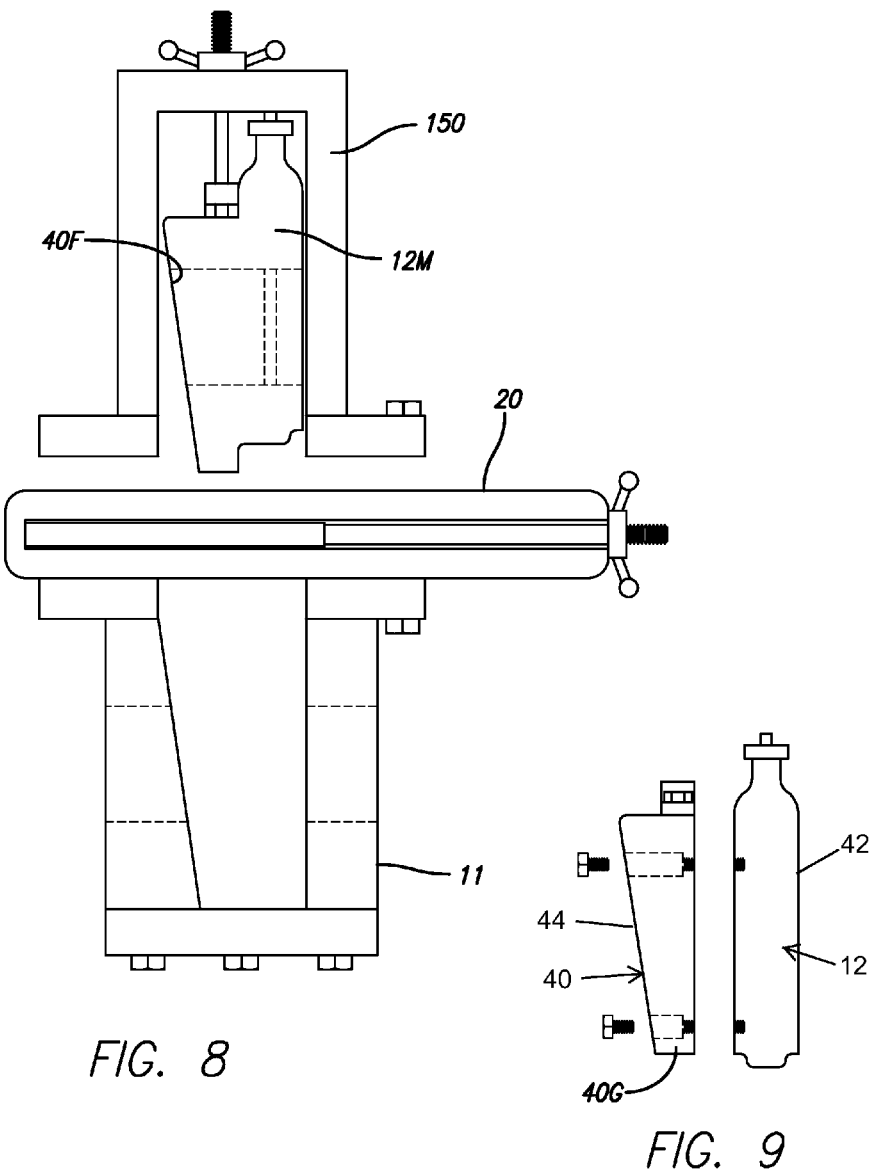

FIG. 8 is a side sectional view of a pipeline control unit similar to that of FIG. 7 showing the pipeline control mechanism as including a butterfly valve manufactured into a cartridge with at least one inclusive wedge, and therefore not requiring an added wedge plate.

FIG. 9 is a side view of the pipeline control unit of FIG. 7 showing how the wedge plate is attached to the pipeline control mechanism as an added component.

Figure 10:
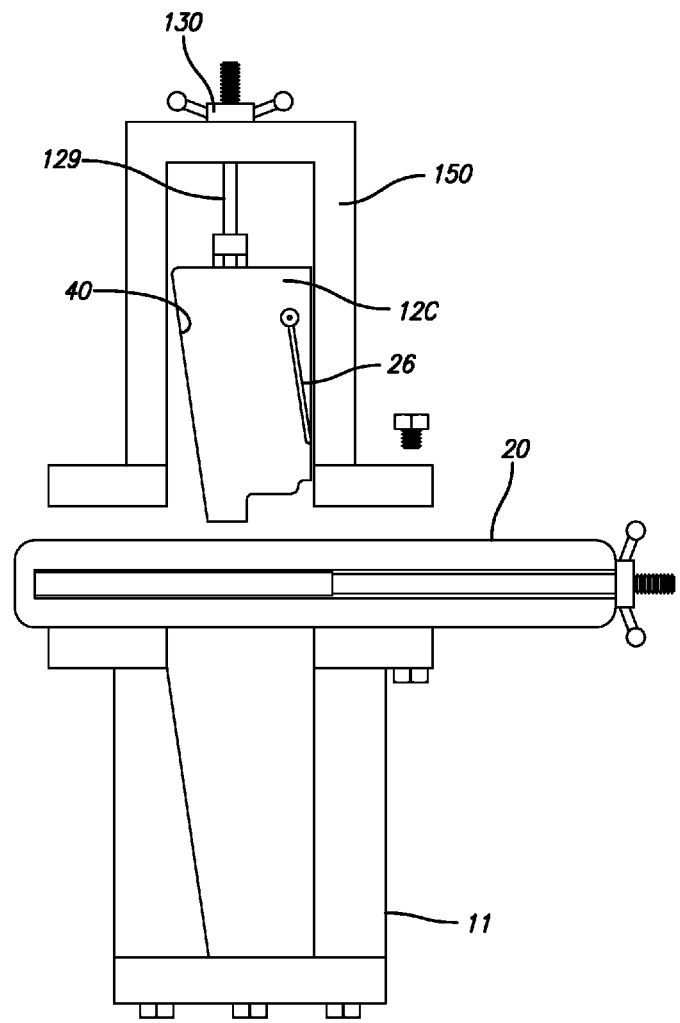

FIG. 10 is a side sectional view of a pipeline control unit similar to that of FIG. 7 showing the pipeline control mechanism as being a through-conduit or office-plate manufactured with at least one wedge side, and therefore not requiring an added wedge plate.

Figure 11:
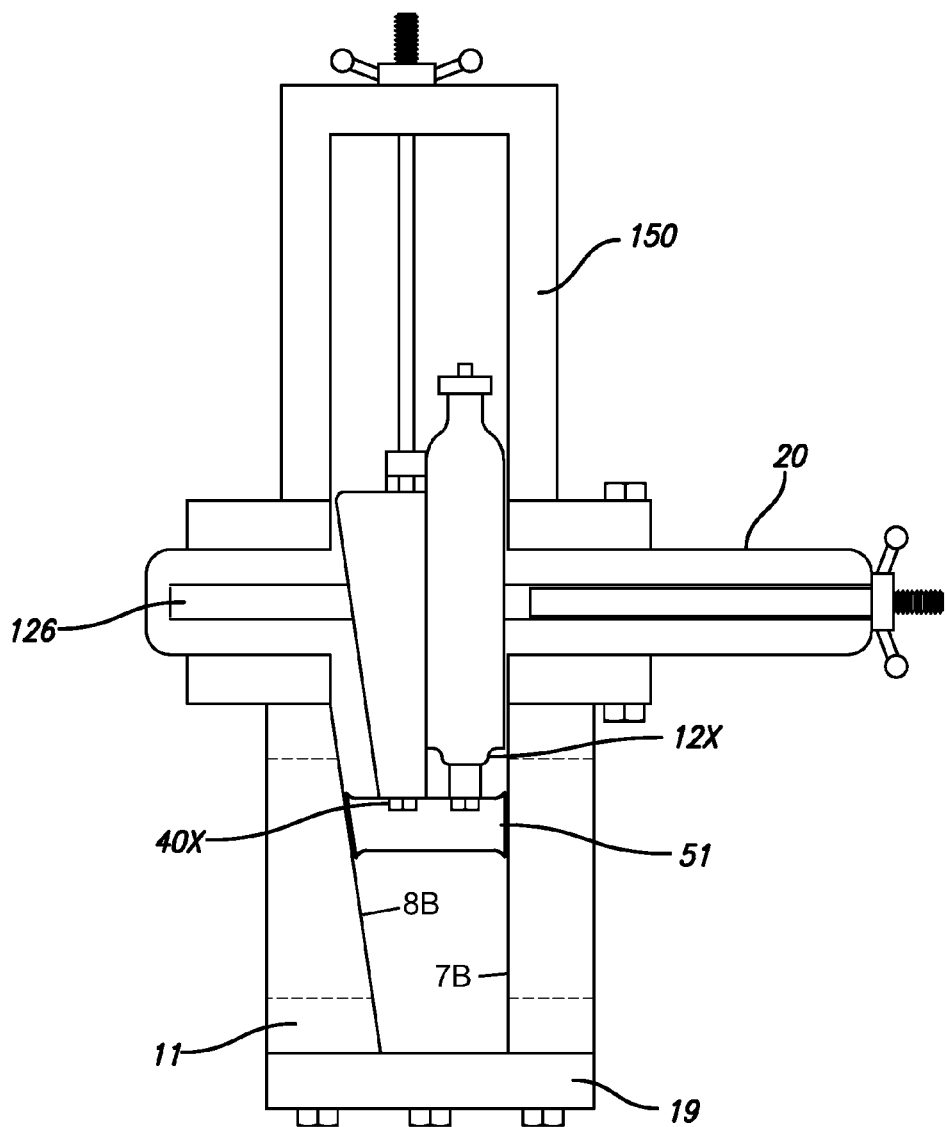

FIG. 11 is a side sectional view of a pipeline control unit similar to that of FIG. 6, showing the pipeline control mechanism being advanced from the attached chamber, through the added isolation valve assembly, and entering the pipeline control unit while the pipeline control unit, valve-servicing assembly and pipeline are fully pressurized. Attached to the pipeline control mechanism is a scraper/sweeping device that can be used to scrape surfaces, squeegee shavings and debris, clearing the internal cavity by providing contact with the internal cavity of the housing. This device can be mounted to the pipeline control mechanism and advanced through the housing until there is engagement between the pipeline control mechanism and the housing.

Figure 12:
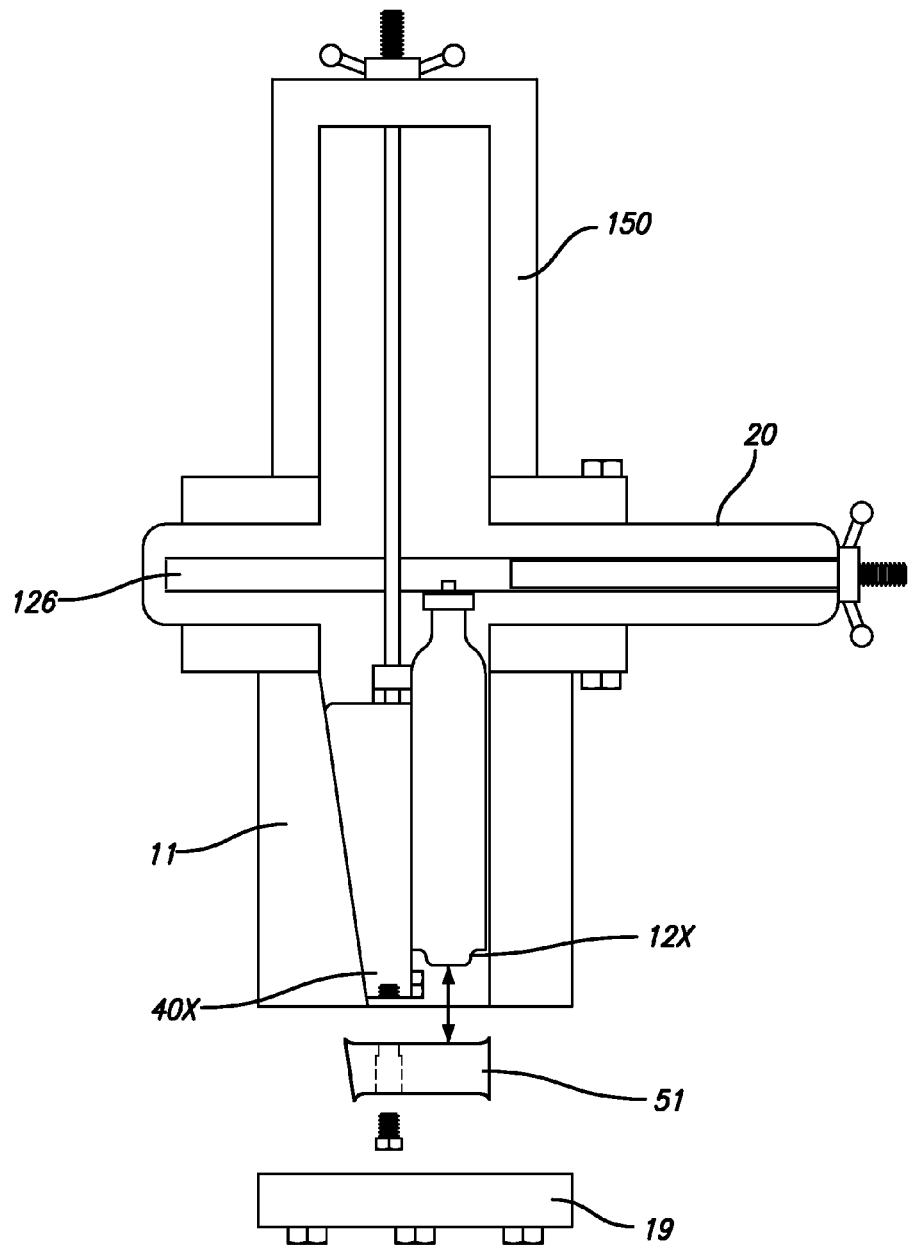

FIG. 12 is side sectional view of the pipeline control unit similar to FIG. 11 showing the pipeline control mechanism in fluid-tight engagement with the housing and being restrained in position by the servicing assembly, with the lower pressure cover plate and scraper/sweeping device removed. When the scraper/sweeping device is disconnected and removed, debris and shavings can be physically removed, after which the step of installing the restraining-device or bolt is performed.

Figure 1:
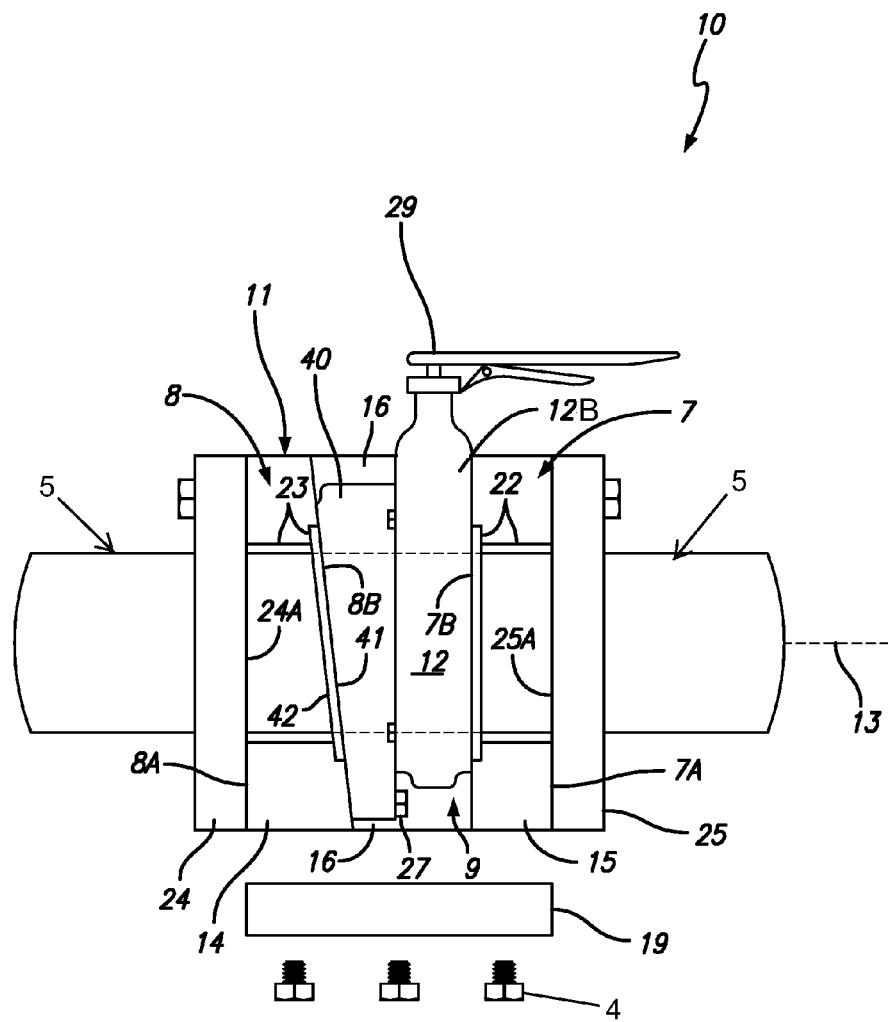
FIG. 1 is a side sectional view depicting the present pipeline control unit holding a butterfly pipeline control mechanism connected to a wedge plate
Figure 13:
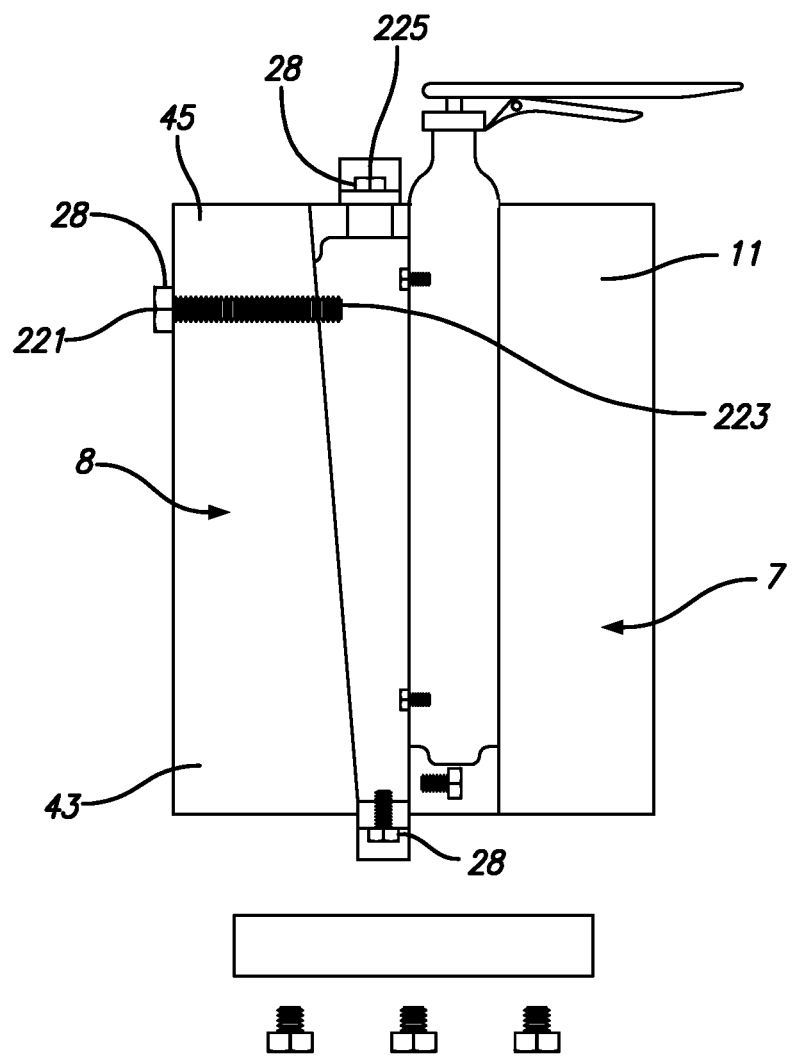

FIG. 13 is a side sectional view of a pipeline control unit similar to that of FIG. 1 in which the housing is in a non-pressurized state and at least one or more additional locking devices are installed connecting the housing and the pipeline control mechanism, for additional restraint.

Figure 14:
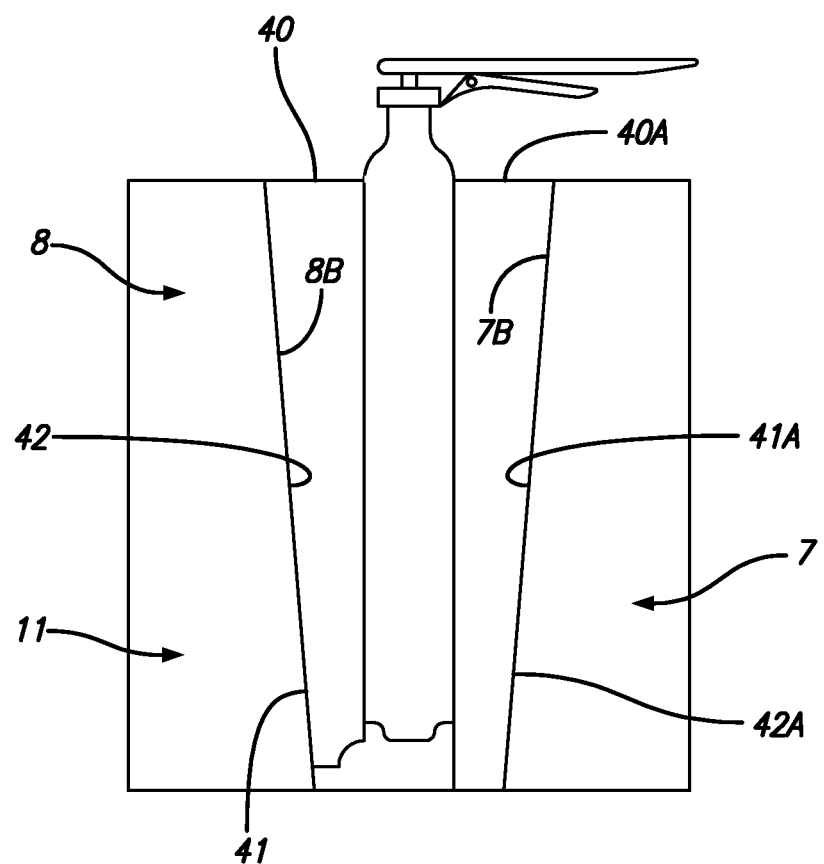

FIG. 14 is a side sectional view of a pipeline control unit similar to that of FIG. 1 but including more that one wedge shape added or incorporated into the pipeline control mechanism for engagement with the housing, in order to perform sealing.

Figure 15:
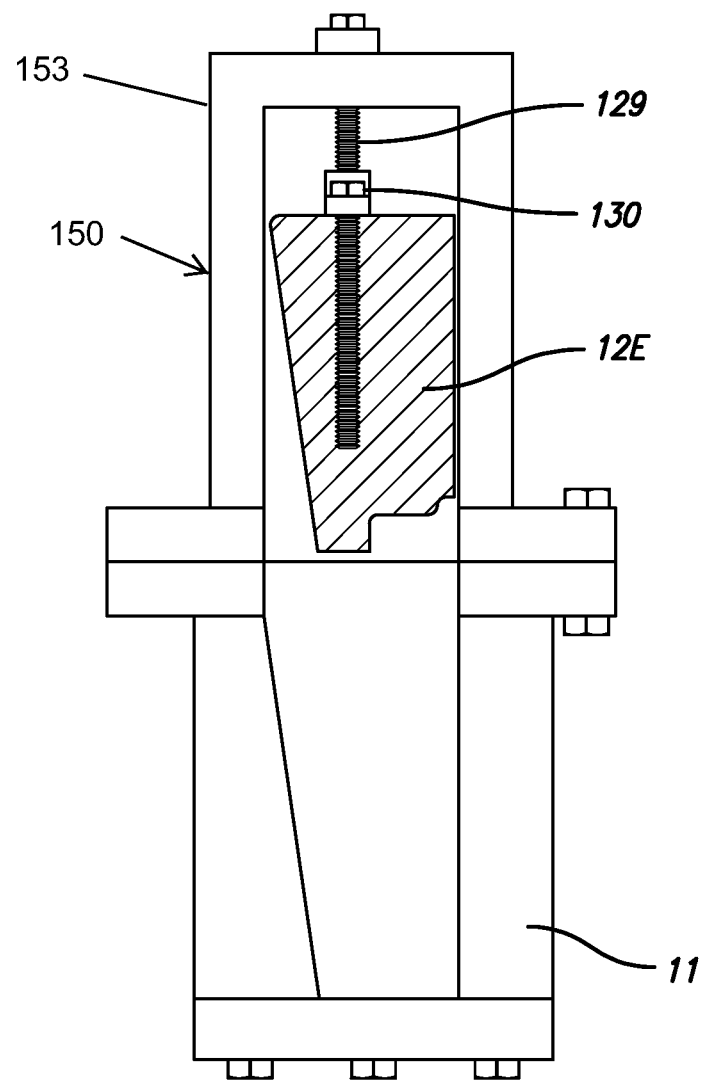

FIG. 15 is a side sectional view of the present pipeline control unit with an installation-retraction mechanism installed on the wedge/gate valve and a permanent or semi-permanent bonnet attached to pipeline control unit without an isolation valve installed in fluid-tight fashion.

Figure 16:
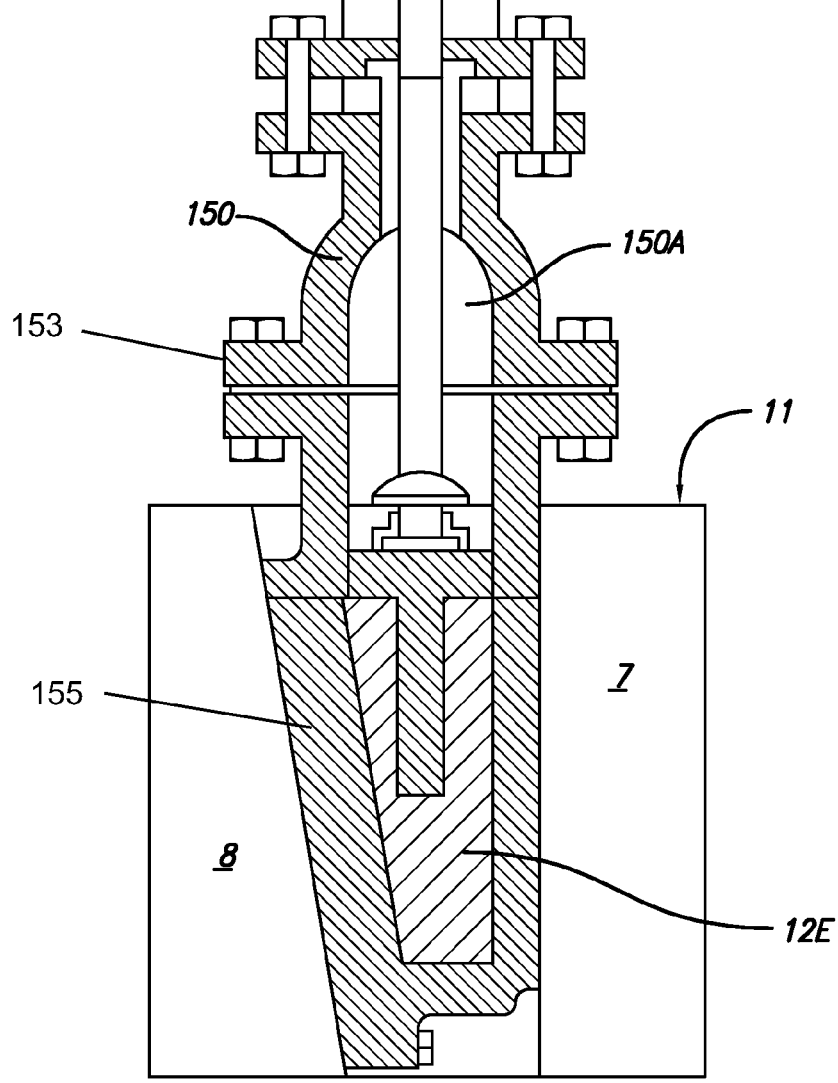

FIG. 16 is a side sectional view of an alternative embodiment of the pipeline control unit of FIG. 15 with a gate style pipeline control mechanism installed into the housing in the closed position. The pipeline control mechanism can be removed, replaced or reinstalled into the housing.

DETAILED DESCRIPTION

Definitions

As used herein, the following terms and variations thereof have the meanings given below, unless a different meaning is clearly intended by the context in which such term is used.

"Compartment" refers to a partially or fully enclosed space within a device or component, such as within the housing of the present pipeline control unit.

"Connection" as used herein includes an indirect connection via one or more intermediate fittings or other components (e.g. a size adapter fitting).

A "connector" or "connection-facilitating means" refers to a mechanism or portion of a mechanism used to mechanically join two or more components of the present device. Connectors can take any of various forms including a flange, threaded receptacle (such as for a screw), groove locking mechanism, a machine screw connector, and any of many other known locking means.

"Fluid-tight," in regard to a connection or barrier between components of the present device, refers to a connection or barrier which does not allow fluid to pass across the connection or barrier when the fluid is at a pressure within predetermined operating limits of the fluid-tight connection or barrier.

"Pipeline" as used herein includes any type, size, and composition of fluid-carrying conduit.

"Pipeline control mechanism" refers to a component or device retained in the housing of the present pipeline control unit which controls, measures, monitors, or otherwise affects the flow of a fluid through the present pipeline control unit. Examples of pipeline control mechanisms include those that can stop fluid flow, reduce fluid flow, and monitor fluid flow, such as one or more of the following: a wedge gate, metal gate, rubber coated gate, a directional-flow mechanism (e.g., a check valve), a through-flow cartridge, a butterfly valve, plug, ball valve, an orifice plate, and/or a safety or protection screen.

"Plate" refers to a sheet or piece of rigid material (such as metal) that forms a distinct section or component of the present device, usually having a height and length greater than its thickness.

A "valve" is a device that regulates the flow of a fluid (typically a liquid, but also including a gas) by opening, closing, or partially obstructing a passageway.

For ease in describing the present invention, the terms "upper" and "lower" are used to refer to features and components of the invention that are located apart from each other, and that typically are opposite each other. These terms are used as relative descriptions, and are not intended to limit the spatial arrangement of such features or components, which can be arranged above and below each other as commonly understood but can also be arranged in another desired orientation (e.g., the reverse orientation, a side-to-side orientation, etc.). Other spatial referents such as "above" and "below" are likewise generally used in a relative rather than an absolute sense.

As used herein, the term "comprise" and variations of the term, such as "comprising" and "comprises," are not intended to exclude other additives, components, integers or steps. The terms "a," "an," and "the" and similar referents used herein are to be construed to cover both the singular and the plural unless their usage in context indicates otherwise.

Support Structure for Pipeline Controls

The present pipeline control unit addresses the problems with currently known replaceable valves for pipelines by providing a pipeline control unit consisting of opposite facing flanges in combination with attachable pressure cover plates and valve servicing assemblies that can be installed onto the pipeline control unit. The assembled unit can selectively become a pressurized structure and once removed can be returned back to a non-pressurized structure, and the same assembly allows a quick change of the pipeline control mechanism.

A pipeline control mechanism, such as a valve or monitor, can be mounted in the housing of the present pipeline control unit and can be configured to enable the user to selectively stop and unstop flow and perform various pipeline services when installed within the housing of the pipeline control unit. The access opening in the housing is arranged to facilitate fluid-tight removable connection of separate isolation valve assemblies to enable a user to remove and replace the pipeline control mechanism through the isolation valve assembly.

A housing having such an access opening can be connected to an isolation valve assembly, after which a pressure housing cover plate is connected to the housing and the pipeline control mechanism is withdrawn from the housing through the isolation valve assembly into the pressure chamber. Reversing the order of these steps reinstalls the pipeline control mechanism.

In one embodiment, the pipeline control unit can be used as a wedge/gate-mechanism through use of added components such as a cover assembly comprising a bonnet and a valve actuator stem. By leaving a pressure cover plate attached to the housing, the unit can become a gate valve and still interchange with all the other pipeline control mechanisms used in the present pipeline control unit.

The present pipeline control unit also addresses the concerns outlined above by providing a housing that does not fully encompass a replaceable pipeline control mechanism bathed in fluid surrounded by an encapsulated "mother-valve". The present pipeline control unit provides a housing that is competitive to a normal valve in price, is similar in size to a standard valve, and is much lighter than any repair valve known today. The housing can remain a housing simply supporting a pipeline control mechanism for the life of the unit in hopes that no problem will arise necessitating repair or replacement of the pipeline control mechanism, without being completely submerged within a "mother-valve" during its life. The access openings can include various means of attachment for pressure cover plates, isolation valve assemblies and servicing assemblies, but a flange-bolt pattern can be preferably used as one option to facilitate selective connection of these added components to the access openings of the valve body as required.

The housing can be manufactured to be used in 1"-144" pipelines and larger, for example. The materials used in the present pipeline control unit can include all known materials useful with pipelines and combinations of such materials, such as carbon steel, stainless steel, brass, exotic metals, and plastics. In addition, the housing can easily use special linings, coatings or plating of any materials installed or applied to selected areas of the present device to protect areas of the structure, the pipeline control mechanism, and/or the flow path where fluid or corrosive products may come into in contact with the housing.

If a problem with a pipeline control mechanism does arise, the present pipeline control unit with added components can become a fully pressurized unit allowing many service procedures to be performed, including: testing of the pipeline control mechanism, replacement of the original pipeline control mechanism, repairing of the pipeline control mechanism, and changing between a butterfly valve, wedge or gate valve, directional-flow mechanism, orifice plate, and/or many other pipeline devices. By not including heavy and expensive components as with a "mother-valve" style repair valve, the present pipeline control unit is much more practical, cost efficient, lighter and smaller than what is available today. Not providing a container that completely encases the pipeline control mechanism on every product greatly reduces the size, weight, and cost of the repair valve. In addition, the size of the housing need not be any larger than what is required to securely retain the pipeline control mechanism and to connect the pipeline conduit to the housing in fluid-tight fashion.

The present invention provides a pipeline control unit that can selectively become a pressure-containing vessel and can facilitate hot tapping, removal, installation, switching and replacement of a pipeline control mechanism without loss of pressure or pipeline product, and after service operations the added components can be selectively removed allowing no debris, fluids or particles to remain within the structure's interior.

The isolation valve assembly and pressure cover plates of the invention are not required to allow the pipeline control unit to be a useful and operational member of a pressurized system. Thus, the optional added valve servicing assembly is only required if the above mentioned services or hot tapping while a pipeline is pressurized is desired, thus greatly reducing the cost to the consumer and requiring less initial investment to design multiple sizes and manufacture them. Containment pressure cover plates that can be added to the structure are components and do not necessarily need to be provided with the initial unit, and all variations of pipeline control mechanisms fit into a gap which can incorporate at least one tapered, angled, or wedge-shaped surface arranged to allow removal and installation of the pipeline control mechanism yet mate against the internal housing, forming a fluid-tight arrangement and providing a fluid-tight engagement between the flange internal surface and pipeline control mechanism. This allows pressure cover plates and the valve-servicing assembly to be removed without loss of system product. Various known materials can be employed to provide sealing, including rubbers, Teflon, plastics and metals.

Once the pressure cover plate is removed, a unique feature of the present pipeline control unit is that the pipeline control mechanism can be secured in place by a locking mechanism, in particular a restraining device such as a bolt. Restraining the pipeline control mechanism in place in fluid-tight arrangement to the housing allows the valve servicing assembly to be removed safely without product loss or the risk of pipeline pressure blowing the pipeline control mechanism out of engagement during service operations. This restraining process can allow removal of the isolation valve assembly and attached service chamber, thus accommodating a method of leaving a solid wedge, an orifice plate or safety-screen in the housing of the present pipeline control unit for long durations if desired.

Once the pipeline control mechanism is restrained, the isolation valve assembly and attached chamber can be removed. A bonnet with a wedge advancing and retracting operator can replace the servicing assemblies and can be installed on the housing without an isolation valve. The operator for the wedge can be rotated or fed into the installed wedge, after which the bonnet is attached in fluid-tight fashion to the housing. The restraining mechanism and/or restraining bolt is then removed and the pressure cover plate is reinstalled. This method converts the pipeline control unit into an operational wedge or gate-valve if the need arises.

A flow-through opening structure or orifice plate, installed into the housing of the pipeline control unit, allows a pipeline fluid to pass through the housing without being in contact with the internal cavity and its surfaces for periods long. The orifice plate can provide different diameters of flow openings to control or restrict passage of fluid or product.

Since the pressure cover plates of the present device are removable, shavings created by hot tapping can be physically removed from the internal cavity after installation of a pipeline control mechanism. By removing pressure cover plates and valve servicing assemblies, a thorough cleaning and removal of shavings is possible without loss of pipeline product, thus solving corrosion and sealing problems.

In addition, a scraper/sweeping device can be directly attached to the pipeline control mechanism as a leading implement in front of the pipeline control mechanism to aid in pushing or sweeping large amounts of the hot tapping cuttings out of the immediate way of the pipeline control mechanism as it is advanced through the inside hollow chamber of the present device toward the pressure cover plate. Once the pipeline control mechanism is installed the pressure cover plate can be removed allowing debris removal and disconnecting of the scraper/sweeping device, which can be reused on another hot tapping application.

The present pipeline control unit offers a hollow internal through-cavity that can allow a good portion of the internal surface to remain open and dry during its life and not exposed to pressurized fluids and corrosion as with previous types of repair valves. When the pipeline control mechanism is removed, all the corrosion built up over time is removed and pulled out along with the scraper/sweeping device and the pipeline control mechanism. Debris will not remain as with the "mother-valve" pressurized container versions and any residual debris can be removed when the pressure cover plate is removed.

Once a new pipeline control mechanism is installed into the housing and the pressure cover plate and valve-servicing assembly is removed, the housing interior is returned back to a non-corrosive environment where fluids and chemicals cannot attack the "mother-valve" interior. The housing is only full of fluid when desired and not completely pressurized during the lifetime of the present pipeline control unit. Because the pipeline control unit can use bolted-on additions to perform services that can be selectively installed and then removed, and that are not required to be purchased unless a need exists, in turn, the weight, size, corrosion and cost are greatly reduced. In addition, heavy, large and expensive permanent pressure containment structures as known on all previous repair valves are components that may not ever be required.

Lighter and non-pressure rated containment covers can be installed in place of rated pressure cover plates in some embodiments, keeping out dirt and environmental contaminants that can attack the internal surfaces of the housing, and these can be selectively installed for applications such as for direct burying applications or for corrosive external environments. Different plates can be selectively installed and replaced for many different applications as desired.

One embodiment of the present pipeline control unit is easily fabricated from simple rated square flanges instead of expensive castings or forgings that are permanently part of the product. The flanges can incorporate wedged and tapered surfaces to provide fluid-tight sealing with the pipeline control mechanism.

One unique feature of the present pipeline control unit is that it can be used as a quick-change valve. Generally when a valve has to be changed, many bolts have to be disengaged between the flanges and a valve structure to loosen it in order to replace it. This disconnection procedure takes time. The present pipeline control unit, as well offering pressurized switching out of pipeline control mechanisms, also allows very quick changing of pipeline control mechanisms on depressurized pipelines. Simple, available tools can be used to provide controlled extraction and installation of the pipeline control mechanism. Pressure plates can be selectively added to help keep fluids from running out of the structure if desired, or left off to allow the debris to flush away while the quick change is being performed.

If a customer has more than one valve in a particular size, it may only require one set of added components for each size of housing to maintain a system. Known repair valves require the customer to pay for the full pressure containment "mother-valve" body at the time of purchase with each valve, causing past repair valves to be uncompetitive with a standard valve.

One optional feature of the present pipeline control unit is the use of at least one wedge plate attached to the pipeline control mechanism with at least one taper to allow many different valves to be modified to fit between the flanges in fluid-tight engagement with a matching taper of the internal surface of the hollow through-cavity of the housing of the present device and at least one taper on the side walls connecting the flanges.

In addition, the use of pressure cover plates can be configured to cover many different valve configurations in fluid-tight arrangement. Some pressure cover plates can look like housings to temporarily encompass valve components much larger than the present housing, similar to how an oil pan covers the crankshaft and rods on an engine. This part does not need to be purchased or rented unless a desire to hot tap, change, repair, replace or switch the pipeline control mechanism is required. The housing can be fully functional as an operational unit without added servicing components.

FIG. 1 of the drawings shows various aspects of a pipeline control unit 10 constructed according to the present invention. Generally, the pipeline control unit 10 includes sub-assemblies referred to in this description as a housing 11 and a pipeline control mechanism 12, pressure cover plate 19 and valve-servicing assembly or isolation valve assembly 140 (shown, e.g., in FIG. 4). Pipeline control mechanisms 12 come readily available and they perform various pipeline functions and operations that will be explained in more detail below.

The housing 11 is preferably a constructed one piece structure that extends along a conduit axis 13 between first and second sides or ends 14 and 15 of the housing 11. The housing also further defines a hollow interior compartment 9. Side walls 17 and 18, depicted for example in FIGS. 2A-2C, couple the two opposing ends 14 and 15, which in the illustrated embodiment are in the form of end plates 7 and 8, respectively. The end plates can be square in form, although interior face of one side is preferably tapered. The side walls and plates of the housing 11 are preferably in fluid-tight communication, so that if pressure cover plate 19 and isolation valve assembly 20 (FIG. 4) are assembled onto the housing 11, as shown in FIG. 5, forming a completed service-assembly 140, the housing 11 can be transformed into a pressurized unit as desired. Adapter plate 21 (FIGS. 4 and 5) can be used as an intermediate assembly between housing 11 and isolation valve assembly 20.

The housing 11 can be composed of steel, ductile iron, composite material, or other suitable composition. The housing 11 can be formed as a single piece, e.g. through casting or molding, or can be assembled from fluid-tight fitted sections or segments. Segments can incorporate a combination of various materials facilitate to sealing including O-ring rubber compounds and known gasket materials and products. The two opposing sides 14 and 15 preferably are flanged for bolting to conventional pipelines, but many attachable configurations can be used, including threaded, grooved or welded configurations.

The pipeline control unit 10 can be assembled with the pipeline sections 24 and 25 during construction or can be installed as a new side connection on pressurized pipelines by a technique known as hot-tapping. As shown in FIG. 1, an outer face 24A of pipeline flange 24 is connected and attached to the outer face 8A of the end plate 8 of the housing 11, and outer face 25A of pipeline flange 25 is connected and attached to the outer face 7A of end plate 7. This places openings 28 in the opposing sides 14 and 15 of the housing 11 in fluid communication with the corresponding openings of each of the pipeline conduits 5. The first and second ends 14 and 15 of the housing 11 can be threaded, flanged, grooved, weld-ended or otherwise configured so that a user can readily connect each end to a respective one of separate first and second pipeline sections, either directly or via intermediate fittings.

Protection liners 22 and 23 can be incorporated into the housing 11 to protect against corrosion and increase wear resistance where the pipeline control mechanism 12 seals by engagement to the interior faces 7B and 8B of end plates 7 and 8 respectively within the interior compartment 9 of housing 11, and can be also installed at other selected locations where pipeline fluid may be in contact with the housing 11. Protective liners 22 and 23 can be made from any material or combination of desired materials including metals, composite, ceramic, Teflon and any other known materials.

The illustrated pipeline can, for example, be a 6-inch (15.2 cm) pipeline which might typically have an outside diameter (O.D.) measuring about 6.5 inches (16.5 cm) to 7.75 inches (19.7 cm), but the present pipeline control unit works on any of various sized pipelines with 1 inch (2.5 cm) diameter up to 114-inch (366 cm) or larger diameter. A housing 11 constructed according to the invention is sized according to the pipe O.D. with which it will be used. Each of the first and second pipeline flanges 24 and 25 connects or bolts to the respective first and second ends 14 and 15 of the housing 11 in a fluid-tight manner.

The housing 11 includes a through body interior compartment 9 that defines a hollow body interior and access openings 16. The interior compartment 9 extends between first and second openings 28 in the first and second sides 14 and 15 of the housing 11, and is sized to accommodate the pipeline control mechanism 12. The interior compartment 9 of the housing 11 comprises a first interior face 8B in communication with a first opening 28 of the housing and a second interior face 7B in communication with a second opening 28. The first interior face 8B is preferably disposed at an acute angle with respect to the second interior face 7B. In such embodiments, the pipeline control mechanism 12 and/or a wedge plate 40 attached thereto can likewise comprise a first face 44 for engaging the first interior face 8B of the interior compartment in a fluid-tight manner and a second face 46 for engaging the second interior face 7B of the interior compartment 9 in a fluid-tight manner (see FIGS. 4, 6, and 9), with the first and second faces of the pipeline control mechanism 12 and/or wedge plate 40 being disposed at an acute angle corresponding to the acute angle of the first and second interior faces of the interior compartment 9. In this way the pipeline control mechanism 12 can be installed, such as by wedging the narrower side of the mechanism into the housing 11, so as to provide fluid-tight communication between the first and second openings 28 of the housing 11.

Preferably, the housing 11 includes means on the upper surface 11A and lower surface 11B adjacent the access opening 16 of the housing 11, as seen in FIG. 4, for facilitating the fluid-tight connection of a pressure cover plate 19. Such means can be for example, a cavity, such as a threaded cavity, for receiving a bolt or machine screw 3. The pipeline control mechanism 12 is removably mounted within the access opening 16 where it functions as a means for enabling a user to selectively stop and unstop fluid communication, for example, or to perform other control functions between the first and second ends 14 and 15 of the housing 11.

Figure 2A:
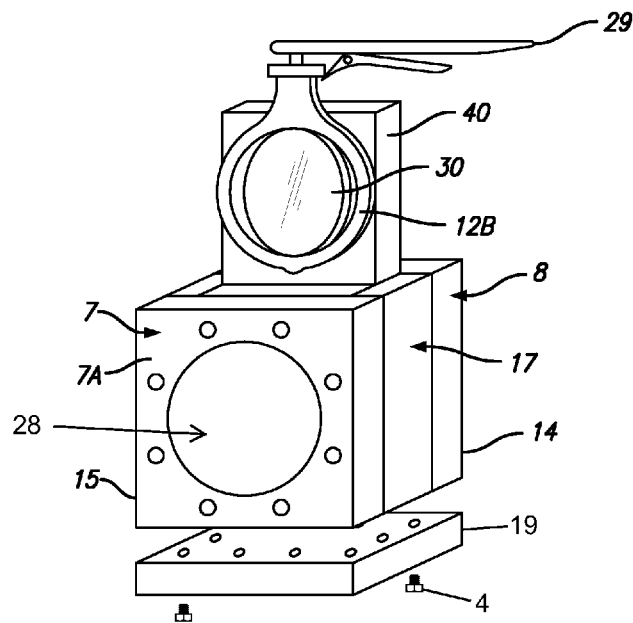
FIGS. 2A, 2B, and 2C are perspective views of the present pipeline control unit, showing the installation of the pipeline control mechanism.
Figure 2B:
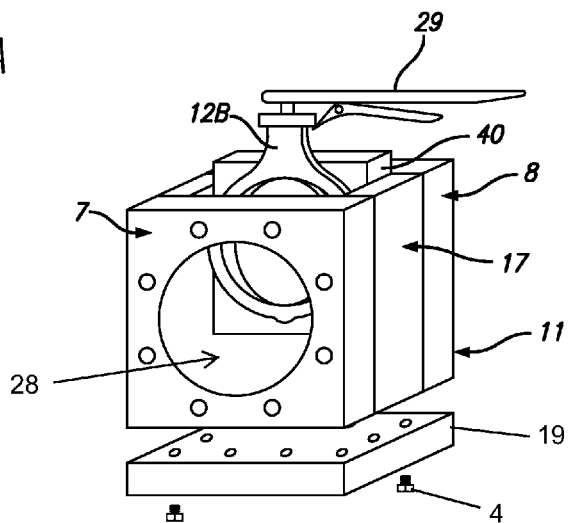
Figure 2C:
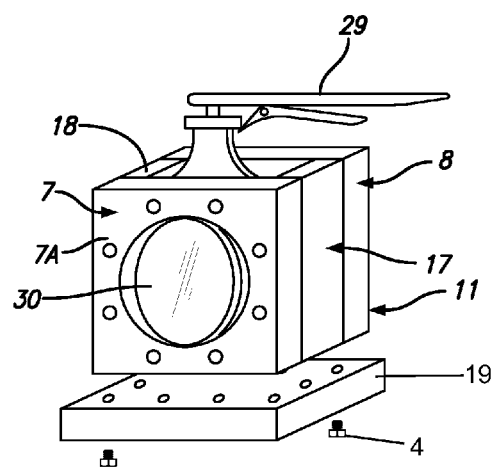
Figure 3A:
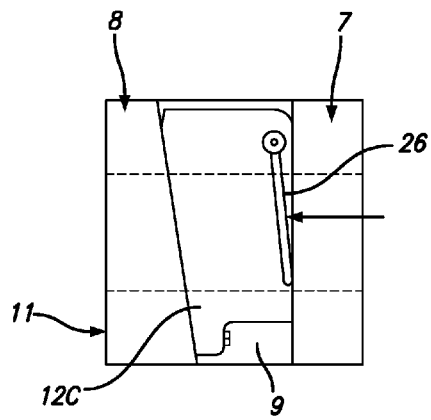
FIG. 3A is a side sectional view of a directional flow device or "check-valve" pipeline control mechanism installed into the housing of the pipeline control unit in the closed position due to incorrect flow direction. The directional flow device can be removed, replaced or reinstalled into the housing.
Figure 3B:
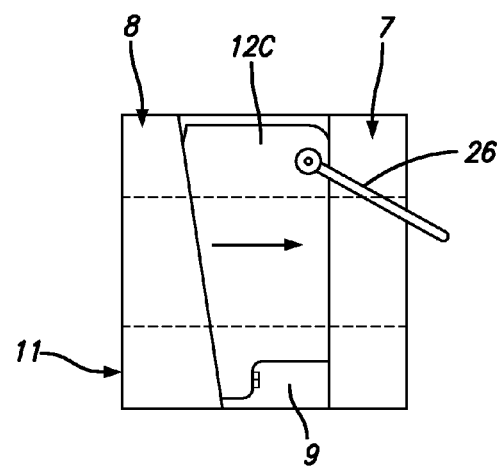
FIG. 3B is a side sectional view of a directional flow device or "check-valve" pipeline control mechanism installed into the housing, as shown in FIG. 3A, in the open position due to correct flow direction.

The pipeline control mechanism 12 depicted in the present pipeline control unit can be, for example, a butterfly valve 12B (FIGS. 2A-2C), a directional-flow device, "check-valve" 12C or other self-operating device that does not require operator assistance (FIGS. 3A-3B), an orifice plate, or a wedge gate, such as a wedge gate having a protection screen 26A. The manually operated pipeline control mechanism 12B depicted in FIG. 2 is an easily obtainable wafer style butterfly valve adapted to install into the housing 11 in fluid-tight engagement. In view of the design of the present pipeline control unit 10 and its adaptable wedge plate 40, standard controls can be converted into an installable and removable cartridge.

The butterfly pipeline control mechanism 12B depicted in FIGS. 1 and 2A-2C provides a hand operated actuator lever 29. The handle 29 as depicted in FIG. 1 is operated by hand where the operator can manually stop and unstop flow communication between pipeline 24 and 25 by rotating the lever 29 which is directly connected to the valve stopping means 30 as depicted in FIGS. 2A and 2C. By selective positioning of the lever 29, various volumes of flow can be controlled through the pipeline control mechanism 12 between unstopped and stopped. Many known operators can take the place of the lever 29 including gear driven, air, hydraulic and electric to name a few.

Figure 3C:
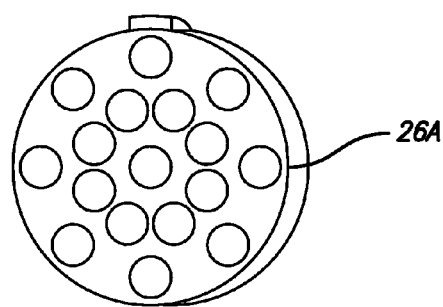
FIG. 3C is a perspective view of a safety-screen pipeline control mechanism that can be installed temporarily or permanently to protect debris from passing through and injuring expensive devices in a pipeline system, and can be removed, replaced or reinstalled in relationship to the housing.

One self-operated pipeline control mechanism 12C is known as a directional-flow device or "check-valve" 12C (see FIGS. 3A and 3B) that uses an activated self sealing one-way flap plate 26 that allows passage of fluid in only one direction. Another self-operating pipeline control mechanism is known as an orifice plate or through-flow device. The use of this orifice plate allows passage of fluid through the housing 11 without relying on the housing 11 being pressurized during transfer of the fluid and protects the access opening 16 of the housing 11 from corrosion. Different diameter orifices can be provided that can alter pipeline flow velocity to restrict flow. One self-operating pipeline control mechanism 26A (FIG. 3C) can provide a protective screen to protect pumps and other critical components in a pipeline system.

A wedge gate pipeline control mechanism 12E as depicted for example in FIGS. 15-16 can be used together with a pipeline control-advancing mechanism (in this case a gate-advancing mechanism) 129 (e.g., a rotatable threaded stem 127 and nut 130A combination). The pipeline control-advancing mechanism 129 functions as a means for enabling a user to advance the gate 12E between open and closed positions. When the gate 12E is in the installed position in engagement with the housing 11 (FIG. 16), it blocks or stops flow so no fluid passes through the housing 11 and when withdrawn into the attached chamber 150A (FIG. 15) fluid is allowed to pass through the housing 11. The gate-advancing mechanism 129 advances (e.g., using a hand-wheel, wrench or suitable tool) as the actuator stem rotates on a rotational axis that is preferably perpendicular to the valve body axis 13, and the gate 12E advances or withdraws along a rotational axis 3 (FIG. 4). Preferably, the pipeline control-advancing mechanism comprises a rigid flange or rod 127 capable of exerting "downward" force on the pipeline control mechanism, in order to help install the pipeline control mechanism, although in some embodiments rigidity may not be necessary.

Once the wedge gate 12E is installed into engagement with the housing 11, the pressure plate 19 can be removed and a restraining device such as bolt 27 (FIG. 1) can be installed. The advancing mechanism 129, the isolation valve assembly 20 and the attached chamber 150 of the valve-servicing assembly 140 can also be removed. Optionally the flange-adapter 21 can remain attached to the housing 11.

A permanent or semi permanent attached cover assembly, comprising chamber 150 and optionally including an advancing mechanism 129, can be installed by attaching to the wedge gate 12E without the reinstallation of the isolation valve 20 (FIGS. 15-16), such that the attached chamber 150 is installed in fluid-tight fashion to the adapter plate 21 or directly to the housing 11. Once assembled and fluid-tight, the restraining device or bolt 27 is removed and the pressure cover plate 19 is installed in fluid-tight position, thus allowing the pipeline control unit 10 to act as a wedge gate valve.

A variety of pipeline control mechanisms 12 used in the industry can be devised to work within the present housing 11. Most styles of "operator" or "non operator" pipeline control mechanisms 12 can include an added wedge plate 40 to provide means to allow sealing into access opening 16 of the housing 11. For example, pipeline control mechanisms 12 can be provided with a single attached wedge plate 40 connected in fluid-tight engagement, and dimensioned with a taper 41 to engage taper 42 (FIG. 1) of the access opening 16 in fluid-tight arrangement.

One set of matching tapers meeting in fluid-tight engagement is depicted in FIG. 1, which shows a wedge 40 having a taper 41 on an outer face of the wedge 40 engaging with the interior face 8B of end plate 8 having a taper 42 in a fluid-tight manner, and an optional embodiment (FIG. 14) with two sets of matching tapers where wedge 40 having taper 41 engages with inner face 8B of end plate 8 having taper 42. And wedge 40A having taper 41A engages with interior face 7B of end plate 7 having taper 42A in fluid-tight engagement. The engaging portions of the wedge plate taper 41 and 41A can include an O-ring seal or other suitable sealing materials at least in one location and depending on product, pressure and temperature many various known materials can be used including metal, composite and Teflon to name a few. Tapered configurations as shown herein are preferably planar, as illustrated.

In one embodiment, the pipeline control mechanism 12M (depicted in FIG. 8) has an included, permanently attached wedge shape 40F and other pipeline control mechanisms 12 can rely on at least one selectively attached wedge plate 40G (as seen in FIG. 8A) assembled in fluid-tight arrangement with the pipeline control mechanism 12. By the use of at least one wedge plate 40, many commercially available pipeline controls can in this way become installable "cartridges," described here as pipeline control mechanisms 12.

All pipeline control mechanism 12 can be selectively attached to the advancing mechanism 129 (as depicted in FIGS. 5-10) and function as a means for enabling a user to advance the pipeline control mechanism 12 between the installed and removed positions. The gate-advancing mechanism 129 advances and withdraws the pipeline control mechanism 12 from its installed position within the housing 11 (FIGS. 5 and 13) to the removed position in the attached chamber 150 (FIG. 10) and selectively back to the installed position as desired. The advancing mechanism 129 is operated, e.g., using a hand-wheel, wrench or suitable means, and on large sizes hydraulic, electric or air activation can be incorporated. Hand operated advancing mechanism 129 (e.g., a rotatable threaded stem 129 and nut 130A combination) use is accomplished by using a user-operated, moveable component 129 that is part of the valve-servicing assembly 140 and selectively connected to the pipeline control mechanism 12. The illustrated moveable component 129 is constructed according to known techniques to grip, turn, and withdraw the pipeline control mechanism 12 under user control.

In one embodiment, the housing 11 includes connection means as shown as the mounting flange on the housing surfaces 11A and 11B (FIG. 4) for attaching a covering or pressure cover plate 19 over the access opening 16 onto the housing 11 in fluid-tight connection. These pressure cover plates 19 are only required if desired. Without the pressure cover plate 19 connected, the housing 11 with installed pipeline control mechanism can still function as a controlling structure without being fully pressurized.

The restraining device or bolt 27 functions as a means for holding or vertically restraining the pipeline control mechanism 12 within the interior compartment 9. For illustrative reasons, just one bolt 27 is shown in the present figures, but those of skill in the art will appreciate that additional restraining mechanisms can be used to secure the pipeline control mechanism and the wedge plate 40 to the housing 11. Such additional restraining devices can be located at a lower portion 43 of the wedge plate 40 and/or in a medial portion or upper portion 45 of the wedge plate 40. FIG. 13 illustrates additional restraining devices in the upper portion 45 of the wedge plate 40 that can help secure the pipeline control mechanism 12 in position and can be used during different stages of servicing as required. In this illustrated embodiment, a bolt 221 is placed through end plate 8 of the housing 11 approximately parallel to axis 13 (although other configurations can also be employed) such that its distal end 223 passes into the wedge plate 40. Another bolt 225 secures the upper surface of the upper portion 45 of the wedge plate 40 by passing approximately vertically into the upper portion 45 (although other configurations are likewise possible) including restraining device securing the pipeline control mechanism 12 directly to the housing 11 instead of the wedge plate 40.

FIGS. 11-12 illustrate a further advantageous feature of the present pipeline control unit 10. A scraping/sweeping device 51 can be attached, preferably to a lower portion of the pipeline control mechanism 12, and can function to remove debris or accumulated deposits from the interior surfaces 7B and 8B of the interior compartment 9 of the housing 11. When loose debris is desired to be cleared and/or when the interior surfaces 7B and 8B are include teflon or other materials that can be relatively easily damaged, the exterior surfaces of the device 51 can be formed from a less abrasive material, while a more abrasive material can be used to remove more persistent material on such surfaces. Debris and cuttings can in this way be removed during servicing in both the installation and removal positions of the pipeline control mechanism 12.

FIGS. 15 and 16 illustrate a further feature of the present pipeline control unit 10. These embodiments illustrate the use of a cover assembly 150. In the embodiment of FIG. 15, the cover assembly 150 is attached directly to the upper access opening of the housing 11. In FIG. 16, the cover assembly 150 instead complete encases the pipeline control mechanism, in this case a wedge gate, and allows it to be retracted into the chamber 150A when the function of the pipeline control mechanism is not needed or desired. In this embodiment the lower portion 155 of the cover assembly 150 comprises openings to provide fluid communication between the two sides of the housing 11 (only an upper portion 153 is used in other illustrated embodiments). can then be secured to the upper side of the isolation valve assembly, with the cover assembly comprising a hollow interior for retaining the pipeline control mechanism and a mechanism, such as a gate-advancing mechanism, for attachment to the pipeline control mechanism. The gate-advancing mechanism is operable to conduct the pipeline control mechanism into the hollow interior of the cover assembly, when the pipeline control mechanism is in need of repair or replacement, for example.

Method of Use

The use of a valve-servicing assembly 140 that includes an isolation valve assembly 20, a chamber-defining structure or cover assembly 150 and an advancing mechanism 129 is illustrated in FIGS. 4-12. FIG. 1 shows the housing 11 installed between the first and second pipeline sections 24 and 25. In servicing the pipeline control mechanism 12 according to the invention, the valve-servicing assembly 140 is connected to the housing 11 over the access opening 16 to the mounting flange 11A (FIG. 4) that is done by bolting the isolation valve assembly 20 directly to the mounting flange 11A (FIG. 5).

The isolation valve 20 is placed in position over the access opening 16 relative to the valve 11 (FIG. 5). The illustrated isolation valve assembly 20 is a slide gate valve that includes first and second ends 20A and 20B (identified in FIG. 5) and a gate 20C shown in FIG. 5 with the gate in the open position. However, any of various known types of valves can be used as an isolation valve as long as the pipeline control mechanism 12 can pass through it. The gate 20C can be closed off after the pipeline control mechanism 12 passes through it to seal off the access opening 16, and selectively opened to expose the access opening 16 as desired.

The attached chamber structure 150 includes an advancing mechanism 129 and is connected to the second end 20B of the isolation valve assembly 20 to form the valve-servicing assembly 140. The advancing mechanism 129 is advanced and securely fastened to the pipeline control mechanism 12 and when assembled restrains the pipeline control mechanism 12 in the engaged position within the access opening 16. Once assembled, the restraining-device bolt 27 can be disconnected and removed to un-restrain the pipeline control mechanism 12 from the housing 11 within the access opening 16. Then the pressure cover plate 19 is installed to the mounting flange 11A (FIG. 5) over the access opening 16 to transform the housing 11 into a pressure containment and fluid-tight structure.

The method continues by operating the advancing mechanism 129 to disengage and withdraw the pipeline control mechanism 12 from the access opening 16 through the open isolation valve assembly 20 into a pressurized chamber 150A within the chamber-defining structure 150.

Withdrawing of the pipeline control mechanism 12 into the chamber-defining structure 150 is depicted in FIGS. 5-7. This is accomplished using a user-operated, moveable component 129 that is part of the valve-servicing assembly 140. The illustrated advancing mechanism 129 is constructed according to known techniques to grip, turn, and withdraw the pipeline control mechanism 12 under user control.

Next, the user closes the isolation valve assembly 20 by moving the gate 20C into receiving space 126 in order to place it in the closed position as depicted in FIG. 7. Doing so isolates the chamber 150A in the chamber-defining structure 150 from the access opening 16 in the housing 11. With the access opening 16 closed in that manner (i.e., isolated), the user can then place a repaired or replacement pipeline control mechanism, such as the mechanism 12 in FIG. 7 or 12M shown in FIG. 8, into the pressurized chamber 150A within the chamber-defining structure 150 and connecting to the advancing mechanism 129, by securing the valve-servicing assembly 140 to the isolation valve assembly 20 and opening it. The pipeline control mechanism 12 is advanced to the engaged position mounted in the access opening 16 defined by the opening defining portion of the valve body 11 in fluid-tight engagement of the housing 11, the pressure cover plate 19 is removed and the restraining-device or bolt 27 is fastened securing pipeline control mechanism 12 to the housing 11 within the access opening 16. Many variations of securing the pipeline control mechanism 12 can be developed without departing from the invention. Once the restraining-device or bolt 27 is installed the valve-servicing assembly 140 can be removed and the access opening 16 can be depressurized and allowed to dry.

In case of repair, the method also includes the following steps. With the valve servicing assembly 140 connected in fluid-tight engagement with the flange of 11A and to the pipeline control mechanism 12, the retention device (bolt 27) is removed and a scraper-sweeping cup 51 (FIGS. 11-12) is attached to the leading-end 40x (FIG. 12) of wedge 40 and optionally to the end of the leading-end 12x of the pipeline control mechanism 12 as depicted in FIG. 12. The pressure cover plate 19 is attached in fluid-tight fashion.

During retracting or withdrawing of the pipeline control mechanism 12 through the access opening 16 toward the chamber-defining structure 150, debris can be cupped or scraped by the single movement. As the pipeline control mechanism 11 is withdrawn through the open isolation valve assembly 20 into a pressurized chamber 150A (identified in FIG. 4) within the chamber-defining structure 150 the scraper-sweeping cup 51 catches and pulls debris and cleans the surface.

When the chamber-defining structure 150 is removed from the isolation valve assembly 20 the debris can be removed or washed away. The process can be reversed for the installation of the replaced pipeline control mechanism 12 and for hot tapping techniques by installing the replaced pipeline control mechanism 12, by attaching the scraper-sweeping cup 51 to the pipeline control mechanism 12, placing it into the pressurized chamber 150A, installing the chamber-defining structure 150 as part of the valve servicing assembly 140 and attaching onto of the isolation valve assembly 20, open the isolation valve assembly 20 and proceed to install the pipeline control mechanism 12 by use of the user-operated, moveable component 129 thus the single installation movement will move the cup, pushing and scraping the debris toward the pressure cover plate 11B. Once the pipeline control mechanism 12 is engaged in fluid-tight arrangement with the housing 11 the pressure cover plate 19 is removed, the scraper-sweeping cup 51 is removed the debris can be removed or washed away and the restraining-device bolt 27 is reinstalled so the valve servicing assembly 140 can be removed.

To summarize the above-described methodology, the method is one for repairing under pressure a pipeline control mechanism or "cartridge" by providing the pipeline control mechanism within the pipeline control unit 10 that is not a pressurized unit but can be converted into a pressurized unit by adding subcomponents to the structure for servicing and upon completion of servicing of the pipeline control mechanism the pipeline control unit 10 can be returned to a non-pressurized support structure for a pipeline control mechanism.

The method includes the step of a valve-servicing assembly of which the isolation valve assembly is a part such that the isolation valve assembly has first and second ends and a size large enough to enable a user to remove the pipeline control mechanism from the access opening through the isolation valve assembly, the valve-servicing assembly including a chamber-defining structure connected to the second end of the isolation valve assembly that defines a chamber in which the pipeline control mechanism fits. The method proceeds by connecting the first end of the isolation valve assembly to the access opening of the valve body in a position over the access opening, removing the restraining-device anchoring the pipeline control mechanism within the pipeline control unit 10, providing a pressure cover plate installed over the access opening to allow pressurization. Withdrawing the pipeline control mechanism from the access opening, through the isolation valve assembly, into the fluid-tight chamber, and closing the isolation valve assembly and reversing the operation to reinstall.

For a depressurized pipeline, the present method includes the step of a quick-change of the pipeline control mechanism when a user desires to remove the pipeline control mechanism from the access opening without pressure. The method proceeds without installing a valve-servicing assembly by removing the restraining device anchoring the pipeline control mechanism 12 within the pipeline control unit 10, and if desired installing a pressure cover plate 19, then withdrawing the pipeline control mechanism 12 from the access opening 16 and reversing the operation to reinstall.

As shown in FIGS. 15 and 16, an installation-retraction mechanism can be installed in a fluid-tight fashion onto the wedge/gate valve and a permanent or semi-permanent bonnet (such as chamber-defining structure 150) can be attached to the present pipeline control unit (directly or via an adapter plate) without an isolation valve installed. The restraining device or bolt can removed and a pressure plate-cover can be installed to the access the opening of the housing. Once assembled the pipeline control mechanism can function as an operational wedge/gate valve to stop and unstop flow if desired.

Based on the foregoing descriptions, one of ordinary skill in the art can readily practice the invention and incorporate various changes without departing form the scope of the claims. The valve body for example, can be manufactured from any of various materials, including ductile iron, cast iron, stainless steel, brass, plastics and any of various exotic materials needed in special applications. The size can range from 1 inch (2.5 cm) diameter or less to a 144 inch (366 vm) diameter or more. In addition, the first and second ends of the valve body can be configured so that a user can readily connect each end to a respective one of separate first and second pipeline sections, either directly or via intermediate fittings using any of various known connection means. These could include flanged, mechanical joint, pipe threads, solder, welded ends, compression and push-in fittings and groove locking methods including cam locks.

Although the present invention has been described in considerable detail with reference to certain preferred embodiments, other embodiments are possible. The steps disclosed for the present methods, for example, are not intended to be limiting nor are they intended to indicate that each step is necessarily essential to the method, but instead are exemplary steps only. Therefore, the scope of the appended claims should not be limited to the description of preferred embodiments contained in this disclosure. All references cited herein are incorporated by reference in their entirety.

What is claimed is:

1. A pipeline control unit, comprising:
    (a) a housing comprising:
        a first side having a first opening for connection to a first fluid conduit;
        a second side having a second opening for connection to a second fluid conduit;
        an interior compartment between the first and second openings;
        an upper access opening between the first and second sides; and
        a lower access opening between the first and second sides opposite the upper access opening;
    (b) a pipeline control mechanism providing fluid communication between the first and second openings of the housing, the pipeline-control mechanism being removably installed within the housing through the upper access opening, wherein the pipeline control mechanism allows fluid flow between the first and second openings of the housing while remaining in fluid-tight engagement with the interior compartment of the housing,
    wherein the lower access opening can be reversibly secured in a fluid-tight manner to a cover plate, and
    wherein the upper access opening can be reversibly secured in a fluid-tight manner to an isolation valve assembly to selectively create a sealed interior compartment, allowing the pipeline control mechanism to be installed or removed from the housing through the isolation valve assembly when the cover plate and isolation valve assembly are connected to the housing without interrupting a flow of fluid between the first and second openings, and wherein the pipeline control mechanism remains operational to provide fluid communication and control between the first fluid conduit and the second fluid conduit when the cover plate and/or the isolation valve assembly are removed.

2. The pipeline control unit of claim 1, further comprising the cover plate, the cover plate being reversibly secured to the lower access opening.

3. The pipeline control unit of claim 2, wherein the cover plate is reversibly secured to the lower access opening with one or more connectors selected from the group consisting of a flange and a screw connector.

4. The pipeline control unit of claim 1, further comprising the isolation valve assembly, the isolation valve assembly being reversibly secured to the upper access opening.

5. The pipeline control unit of claim 1, further comprising the isolation valve assembly, wherein the isolation valve assembly comprises:
  a slide gate comprising a moveable gate barrier and a receptacle for receiving the gate barrier; and
  a cover assembly comprising a hollow interior for retaining the pipeline control mechanism and an advancing mechanism for attachment to the pipeline control mechanism, wherein the advancing mechanism is operable to conduct the pipeline control mechanism into the hollow interior of the cover assembly.

6. The pipeline control unit of claim 5, wherein the isolation valve assembly is reversibly secured to the upper access opening with one or more connectors selected from the group consisting of a flange and a screw connector.

7. The pipeline control unit of claim 1, wherein the interior compartment comprises a first interior face in communication with the first opening and a second interior face in communication with the second opening, the first interior face being disposed at an acute angle with respect to the second interior face.

8. The pipeline control unit of claim 7, wherein the pipeline control mechanism comprises a first face for engaging the first interior face of the interior compartment in a fluid-tight manner and a second face for engaging the second interior face of the interior compartment in a fluid-tight manner, wherein the first and second faces of the pipeline control mechanism are disposed at an acute angle corresponding to the acute angle of the first and second interior faces of the interior compartment.

9. The pipeline control unit of claim 7, wherein the pipeline control mechanism is attached to a wedge plate, the wedge plate comprising a first face for engaging the first interior face of the interior compartment in a fluid-tight manner and the pipeline control mechanism comprising a second face for engaging the second interior face of the interior compartment in a fluid-tight manner, wherein the first face of the wedge plate and the second face of the pipeline control mechanism are disposed at an acute angle corresponding to the acute angle of the first and second interior faces of the interior compartment.

10. The pipeline control unit of claim 7, wherein the pipeline control mechanism is attached to a first wedge plate and a second wedge plate, the first wedge plate comprising a first face for engaging the first interior face of the interior compartment in a fluid-tight manner and the second wedge plate comprising a second face for engaging the second interior face of the interior compartment in a fluid-tight manner, wherein the first face of the first wedge plate and the second face of the second wedge plate are disposed at an acute angle corresponding to the acute angle of the first and second interior faces of the interior compartment.

11. The pipeline control unit of claim 1, wherein the pipeline control mechanism is a flow control mechanism or a monitor.

12. The pipeline control unit of claim 11, wherein the pipeline control mechanism is a flow control mechanism selected from the group consisting of a check valve, a flow-through cartridge, a butterfly valve, a plug, a ball valve, an orifice plate, a gate valve and a protection screen.

13. The pipeline control unit of claim 1, wherein the pipeline control mechanism is a monitor selected from the group consisting of a temperature monitor and a flow monitor.

14. The pipeline control unit of claim 1, wherein the first side of the housing comprises a first end plate and the second side comprises a second end plate, wherein the first and second end plates are joined by two side walls, each side wall extending between lateral sides of the first end plate and the end second plate.

15. The pipeline control unit of claim 1, wherein the first end plate and second end plate are square in form.

16. A method for removing the pipeline control mechanism of claim 1 under pressure, compromising:
  attaching the cover plate to the lower access opening;
  attaching the isolation valve assembly to the upper access opening, the isolation valve assembly comprising a gate attached to the upper access opening for creating a fluid tight seal and a cover assembly attached to the gate, the cover assembly comprising a hollow interior for retaining the pipeline control mechanism;
  withdrawing the pipeline control mechanism through the upper access opening into the cover assembly;
  closing the gate of the isolation valve assembly to create a fluid tight seal.

17. The method of claim 16, further comprising the steps of:
  removing the pipeline control mechanism from the cover assembly;
  placing a new or repaired pipeline control mechanism in the cover assembly;
  opening the gate of the isolation valve assembly;
  advancing the new or repaired pipeline control mechanism from the interior of the cover assembly, through the gate and the upper access opening while system is still pressurized; and
  installing the new or repaired pipeline control mechanism in fluid-tight engagement with the interior compartment of the housing of the pipeline control unit.

18. The method of claim 16, further comprising the step of disconnecting the isolation valve assembly from the upper access opening of the pipeline control unit.

19. The method of claim 17, further comprising the steps of:
  disconnecting the cover plate from the lower access opening of the pipeline control unit; and
  providing a flow of fluid between the first and second openings.

20. The method of claim 16, further comprising the step of installing at least one restraining device that connects pipeline control unit to a wedge plate allowing positive retention prior to removal of the isolation valve assembly.

21. The method of claim 16, further comprising the step of installing at least one restraining device to secure the pipeline control mechanism to the housing of the pipeline control unit in order to more securely retain the pipeline control mechanism within the housing prior to removal of the isolation valve assembly.

22. The method of claim 16, further comprising the step of cleaning the interior of the housing of the pipeline control unit by attaching a scraping attachment to the pipeline control mechanism.

\* \* \* \* \*